United States Patent [19]

Wurman

[11] 4,012,558
[45] Mar. 15, 1977

[54] PROCESS FOR THE MANUFACTURE OF FLAME-RESISTANT BOARDS, A FLAME-RETARDANT MIXTURE AND A FLAME-RETARDANT BONDING COMPOSITION CONTAINING THE SAME

[75] Inventor: Eliahu Wurman, Arad, Israel

[73] Assignee: Dead Sea Bromine Company Ltd., Beer-Sheva, Israel

[22] Filed: May 22, 1974

[21] Appl. No.: 472,105

[30] Foreign Application Priority Data

May 22, 1973  Israel .................................... 42334

[52] U.S. Cl. ................................ 428/411; 252/8.1; 260/51.5; 260/67.6 R; 260/70 R; 260/840; 260/849; 260/DIG. 24; 428/537; 428/538; 428/921
[51] Int. Cl.$^2$ ..................... C09K 3/28; B27K 3/52
[58] Field of Search ................... 252/8.1; 117/137; 260/DIG. 24, 70 R; 428/921, 411, 537, 538

[56] References Cited

UNITED STATES PATENTS

| | | |
|---|---|---|
| 2,452,054 | 10/1948 | Jones et al. ..................... 252/8.1 X |
| 2,520,103 | 8/1950 | MacMillan et al. ............... 117/137 |
| 2,784,159 | 3/1957 | Fluck et al. ..................... 117/137 X |
| 3,762,942 | 10/1973 | Putnam et al. ..................... 117/137 |
| 3,811,992 | 3/1974 | Handa et al. .................. 252/8.1 X |
| 3,819,518 | 6/1974 | Endler ................................. 252/8.1 |

FOREIGN PATENTS OR APPLICATIONS 796,224  10/1968  Canada

Primary Examiner—Herbert B. Guynn
Attorney, Agent, or Firm—Millen & White

[57] ABSTRACT

Flame resistant boards of bonded wood sheets and/or lignocellulosic material wherein the boards are bonded with a bonding agent, such as a formaldehyde resin, and a flame retardant mixture comprising ammonium bromide, an organic phosphate such as urea phosphate and an amine derivative of a formaldehyde polymer such as hexamethylenetetramine whereby said amine derivative inhibits the rate of gelling of said bonding agent.

14 Claims, No Drawings

PROCESS FOR THE MANUFACTURE OF FLAME-RESISTANT BOARDS, A FLAME-RETARDANT MIXTURE AND A FLAME-RETARDANT BONDING COMPOSITION CONTAINING THE SAME

The present invention relates to a process for the manufacture of flame-resistant boards of bonded wood sheets and/or lignocellulose material, a flame retardant mixture adapted for incorporation into the bonding agent used in the preparation of such material and a flame-retardant bonding composition. More particularly the process and flame retardant mixture and bonding composition of the present invention are directed towards the production of flame-resistant chipboard, plywood and the like, made from wooden ply sheets bonded together and/or bonded particulate lignocellulosic material. A typical example of the latter is the so-called chipboard which is made of wood particles and a binder and which is produced by curing under pressure a composition comprising the wood particles and the binder.

The term "wood particles" as used throughout this specification and in the appended claims, however, is intended to include particles, chips, shavings, flakes, strands, and the like of the type used in the manufacture of particle boards, chipboard and flake boards.

The conventional method for imparting fire resistance to bonded lignocellulosic material and wood products is to completely submerge the article (plate, board, pieces) in an aqueous or non-aqueous solution containing the additives designed to remain in the wood after subsequent removal of the solvent such as described in German Pat. No. 2,124,757; U.S. Pat. No. 3,519,476; Chemical Week, Aug. 4, 1971, pp. 22 and Forest Product Journal, Dec. 1963, pp. 549. These and many other publications point to a pressure impregnation method, however, this method is expensive and time consuming, involving expensive equipment, and additional drying and sanding steps.

Another method practiced is the addition of fire retardant materials separately, in the solid state, to the wood prior to the addition of the bonding agent, tumbling-mixing and then subsequently adding adhesive. It is also known to be possible to add the adhesive first and then to follow with the flame retardant solids (U.S. Pat. No. 3,415,765; and Jour. Mat. Vol. 1, No. 3, pp. 625–643, 1966). In this method of solid addition, however, one is often faced with problems of inhomogeneous mixing and pre-reaction of salts added with the bonding agent.

In light of the fact that it has been found on the one hand that flameproofing of structures of bonded particulate lignocellulosic material and/or wooden sheets by mere impregnation or coating besides having the aforementioned disadvantages is also inefficient since the protection afforded is, in fact, only superficial and on the other hand that it is important that the stability (working life) of the bonding agent is not disturbed through the addition of materials designed to impart a new property to the wooden objects, and that the time necessary for preparing these objects (plywood, chipboard) should not be extended, a method has been sought which would allow the direct addition of a material to the bonding agent without resulting in the immediate gelling of said bonding agent, which gelling usually accompanies the direct addition of a salt ingredient to the bonding agent.

Thus it has been suggested in Canadian patent 796,224 to flame-proof various bonded lignocellulosic articles by incorporating in the fluid bonding agent composition at least two substances one of which is an inorganic bromide and the other is either another inorganic bromide or an inorganic oxybromide. The two substances are complementary in that one is capable of lowering either the viscosity or the surface tension of the bonding agent composition while the other is capable of raising the same property, and they are added in such a total quantity as to impart to the article a desired degree of fire resistance and in such relative proportion that the surface tension or the viscosity assume a selected and preferred value.

While this method gives improved results it suffers from the disadvantage that it is confined to the use of inorganic bromides and oxybromides only, which substantially raise the cost of the flame retardant material. Moreover, it requires the employment of special controls so as to adjust the surface tension and/or the viscosity of the bonding agent composition. In addition, the incorporation of inorganic salts causes a very sharp increase in the swelling of the wood and also a drastic reduction in the breaking and bending strength. Especially, if one uses ammonium bromide, which is considered a very efficient flame retardant material, one encounters a drastic reduction in the bending strength of the wood (Cf. Israel Pat. No. 27503 to M. Lewin). Therefore it is an object of the present invention to overcome all of the aforementioned difficulties and disadvantages of the prior art by providing a new process for the manufacture of flame-resistant boards of bonded wood sheets and/or lignocellulosic material and a flame retardant mixture, which mixture:

a. enables a smooth manufacture of chipboard, plywood and the like by the addition of materials to the bonding agent preferably prior to its admixture with the wood particles or sheets and not necessitating any additional cumbersome steps;

b. renders said product flame retardant at relatively low cost;

c. not only does not harm the product but improves the physical attributes of the resultant board;

d. preferably becomes incorporated in the matrix of the adhesive and therefore overcomes difficulties with residual inorganic salts present with other materials used for flame retardancy in chipboard; and e. enables a prolonged working time with the bonding agent even though it includes flame retardant salts.

Thus according to the present invention there is provided a flame-retardant mixture adapted for incorporation into the bonding agent used in the production of chip-board, plywood and the like comprising ammonium bromide, urea phosphate and hexamethulenetetramine, and a process for the manufacture of flame resistant boards of bonded wood sheets and/or lignocellulosic material comprising the step of admixing with the bonding agent a flame retardant mixture comprising ammonium bromide, urea phosphate and hexamethylenetetramine.

Preferably in the process of the present invention said step is carried out prior to the admixture of the bonding material with said wood or lignocellulosic material.

In the manufacture of chipboard, plywood and the like use is made of thermosetting bonding agents such as phenol-formaldehyde resins, urea and melamine formaldehyde resins, mixtures of two or more of the above resins, mixtures of one or more of the above resins with starch, and many other such resins. These bonding agents are either sprayed on wood particles prior to the preparation of the loaf from which the chipboard itself is prepared by pressing it, or the individual wooden plates are passed through a glue bath before being combined in the press to form the plywood. In the bonding, flame-retardant compositions of the present invention, urea formaldehyde is preferred as the bonding agent.

Since glue material requires a hardening agent (hardener) in any case, the ammonium bromide and/or urea phosphate act as hardeners, and the amount of hexamine is adjusted to impart proper work-life (pot life) and hardening speed (Gel time) to the glue/flame retardant combination.

While the invention will be described in connection with certain preferred embodiments in the following examples it will be understood that it is not intended to limit the invention to these particular embodiments. On the contrary, it is intended to cover all alternatives, modifications and equivalent arrangements as may be included within the scope of the invention as defined by the appended claims. These examples illustrate the preparation of some of the inventive compositions, formulations used, and the testing procedure used to evaluate the worth of the compositions as flame retardants.

EXAMPLE 1

Chipboard plates were prepared using the two-layer system i.e. an overlay of finer beechwood chips and thicker core (middle layer) of larger beechwood chips. Kaurit 385 (BASF) ureaformaldehyde glue was used, at a concentration of 50 percent adhesive solids in water. The adhesive was added to the chips to a final concentration of 18% adhesive in the cover layers and 9% in the core. Plates were pressed for ten minutes at 140° C and 25 kp/cm$^2$. The following are the characteristics of the final product:

| Final Thickness plate | Density | Moisture | Swelling 2 hr | H$_2$O 24 hr. | Oblique Tear Strength | Bending Strength | Flame Test Rand* |
|---|---|---|---|---|---|---|---|
| mm | gm/cc | % | % | % | kp/cm$^2$ | kp/cm$^2$ | |
| 20 | 0.60 | 9 | 6 | 12 | 8.5 | 220 | Poor-flammable |

*Standard French "Reaction du feu" test method

EXAMPLE 2–4

The above procedure was repeated but this time flame retardant mixtures were added, in total amounts equal to total solids of adhesive, i.e. 9% in the core layer and 18% in the cover layers.

| | | | | Gel Time | |
|---|---|---|---|---|---|
| Example | Mixture | Components and Ratio* | | 100° C | 35° C |
| 2 | 1 | 25/37/37 | A/U/H | 72 sec. | over 4 hr. |
| 3 | 2 | 25/45/30 | A/U/H | 60 sec. | 60 min. |
| 4 | 3 | 25/42/33 | A/U/H | 79 sec. | 79 min. |

*A-Ammonium Bromide
U-Urea Phosphate
H-Hexamine

| Example | Final Thickness Plate | Density | Moisture | Swelling - H$_2$O 2 hr. | Swelling - H$_2$O 24 hr. | Oblique Tear Strength | Bending Strength | Flame Test Rank |
|---|---|---|---|---|---|---|---|---|
| | mm. | gm/cc | % | % | % | kp/cm$^2$ | kp/cm$^2$ | |
| 2 | 19.5 | 0.71 | 11.7 | 3.1 | 16.4 | 11.6 | 280 | Difficile |
| 3 | 19.4 | 0.70 | 11.3 | 2.7 | 11.1 | 9.2 | 154 | Inflammable |
| 4 | 19.4 | 0.71 | 11.3 | 3.6 | 12.8 | 8.8 | 284 | |

EXAMPLE 5

A mixture containing the same components as examples 2–4 were combined in an equal weight ratio (i.e. 1/1/1). Results were identical to example 4 above.

It is evident from the above that the mixture of the present invention overcomes the difficulties inherent in the prior art and in fact has shown to contribute much to the strength and swelling resistance of the wood after impregnation with the adhesive containing the flame retardant materials.

It will be evident to those skilled in the art that the invention is not limited to the details of the foregoing illustrative embodiments and that the present invention may be embodied in other specific forms without departing from the spirit or essential attributes thereof. It is therefore desired that the present embodiments be considered in all respects as illustrative and not restrictive, reference being made to the appended claims, rather than to the foregoing description, in which it is intended to claim all modifications coming within the scope and spirit of the invention.

What is claimed is:

1. A flame retardant mixture adapted for incorporation into the bonding agent used in the production of chipboard, plywood and the like consisting essentially of ammonium bromide, urea phosphate and hexamethylenetetraamine, said hexamethylenetetraamine being present in a sufficient amount to inhibit the rate of gelling of said bonding agent said ammonium bromide and urea phosphate being present in flame retarding amounts.

2. A flame retardant composition according to claim 1 wherein the weight ratio of the ammonium bromide to urea phosphate to hexamethylenetetraamine is about 1:1:1 to about 1:1.8:1.48.

3. A flame retardant composition according to claim 1 wherein the weight ratio of the ammonium bromide to urea phosphate to hexamethylenetetraamine is about 25:37:37.

4. A flame retardant composition according to claim 1 wherein the weight ratio of the ammonium bromide to urea phosphate to hexamethylenetetraamine is about 25:45:30.

5. A flame retardant composition according to claim 1 wherein the weight ratio of the ammonium bromide to urea phosphate to hexamethylenetetraamine is about 25:42:33.

6. A flame retardant composition according to claim 1 wherein the weight ratio of the ammonium bromide to urea phosphate to hexamethylenetetraamine is about 1:1:1.

7. A flame retardant thermosetting bonding composition consisting essentially of a flame retarding amount of a flame retardant composition and phenol-formaldehyde resin, urea-formaldehyde resin, melamine-formaldehyde resin, or mixtures of said resins, said flame retardant composition being the composition according to claim 1.

8. A flame retardant thermosetting bonding composition according to claim 7 wherein said resin is a urea-formaldehyde resin.

9. A flame retardant thermosetting bonding composition according to claim 8 wherein said resin and said flame retardant compositiion are present in equal proportions.

10. A flame retardant thermosetting bonding composition according to claim 9 wherein the weight ratio of the ammonium bromide to urea phosphate to hexamethylenetetraamine is about 1:1:1 to about 1:1.8:1.48.

11. In flame resistant boards of bonded wood sheets and/or lignocellulosic material, the improvement wherein the bonding agent is a composition according to claim 7.

12. In flame resistant boards of bonded wood sheets and/or lignocellulosic material, the improvement wherein the bonding agent is a composition according to claim 8.

13. In flame resistant boards of bonded wood sheets and/or lignocellulosic material, the improvement wherein the bonding agent is a composition according to claim 9.

14. In flame resistant boards of bonded wood sheets and/or lignocellulosic material, the improvement wherein the bonding agent is a composition according to claim 10.

* * * * *